(12) United States Patent
Ezekiel

(10) Patent No.: US 9,943,994 B2
(45) Date of Patent: Apr. 17, 2018

(54) METHOD OF CAST MOULDING A TRANSLATING MULTIFOCAL CONTACT LENS

(71) Applicant: Ezekiel Nominees PTY LTD, North Fremantle, Western Austalia (AU)

(72) Inventor: Donald Frederick Ezekiel, North Fremantle (AU)

(73) Assignee: EZEKIEL NOMINEES PTY LTD, North Fremantle (AU)

( * ) Notice: Subject to any disclaimer, the term of this patent is extended or adjusted under 35 U.S.C. 154(b) by 0 days.

(21) Appl. No.: 15/615,516

(22) Filed: Jun. 6, 2017

(65) Prior Publication Data

US 2017/0266850 A1  Sep. 21, 2017

Related U.S. Application Data

(63) Continuation of application No. 14/375,104, filed as application No. PCT/AU2012/000948 on Aug. 10, 2012, now Pat. No. 9,676,125.

(30) Foreign Application Priority Data

Sep. 9, 2011 (AU) .............................. 2011903685

(51) Int. Cl.
  *B29C 39/02* (2006.01)
  *G02C 7/04* (2006.01)
  *B29D 11/00* (2006.01)

(52) U.S. Cl.
  CPC ...... *B29C 39/026* (2013.01); *B29D 11/00028* (2013.01); *B29D 11/00038* (2013.01);
  (Continued)

(58) Field of Classification Search
  CPC ............ B29C 39/026; B29D 11/00038; B29D 11/0048
  See application file for complete search history.

(56) References Cited

U.S. PATENT DOCUMENTS 5,517,259 A   5/1996 Blum et al.
5,611,970 A   3/1997 Apollonio et al.
(Continued)

FOREIGN PATENT DOCUMENTS

AU   769719 B2   6/2001
CN   1856729 A   11/2006
(Continued)

OTHER PUBLICATIONS

European Search Report and Written Opinion for EP Application No. 12830565.3 dated Mar. 26, 2015.
(Continued)

*Primary Examiner* — James Sanders
(74) *Attorney, Agent, or Firm* — Moore & Van Allen PLLC; Henry B. Ward, III

(57) ABSTRACT

There is provided a contact lens (60) which is produced by cast molding. The cast molding is achieved by the use of an anterior face mold insert (30) which has a cap (24) with a domed surface (26) and a body (10). The domed surface has provision for a distance vision segment (31) and a reading segment (32) separated by a demarcation (33). Further, the cap (24) has a cutaway portion (20) for producing a lower ledge and the body (10) has a projection (18) for producing a lower truncation in the resultant lens. Means is also described for forming a posterior face of the contact lens (60).

5 Claims, 6 Drawing Sheets

(52) U.S. Cl.
CPC .......... *B29D 11/0048* (2013.01); *G02C 7/043* (2013.01); *G02C 7/045* (2013.01)

(56) References Cited

U.S. PATENT DOCUMENTS

| | | |
|---|---|---|
| 5,861,114 A | 1/1999 | Roffnlan et al. |
| 2004/0075807 A1 | 4/2004 | Ho et al. |
| 2004/0263776 A1 | 12/2004 | Ezekiet |

FOREIGN PATENT DOCUMENTS

| | | |
|---|---|---|
| EP | 2031432 B1 | 3/2009 |
| WO | 0142002 A1 | 6/2001 |

OTHER PUBLICATIONS

Internationai Search Report and Written Opinion for PCT/AU2012/000948 dated Aug. 28, 2012.

International Preliminary Report on Patentability (IPRP) with amended pages for PCT/AU2012/000948 dated Dec. 13, 2013.

URL: http://web.archive.org/web/20110623171010/http://www.al-laboutvision.com/contacts/bifocals/htm published on Jun. 23, 2011 as per Wayback Engine.

URL: http://web.archive.org/web/20110811120615/http://www.contactlenses.org/bifocal_conact_lenses.htm published on Aug. 11, 2011 as per Wayback Engine.

URL: http://www.sillconehydrogels.org/editorials/previous_editorial_jackie_tan.asp published on Feb. 22, 2011 as per Waybadk Engine.

'Clinical Contact Lens Practice' Edward S. Bennett, Barry A. Weissman, Lippincott Williams and Wilkins 2005 Medical p. 204.

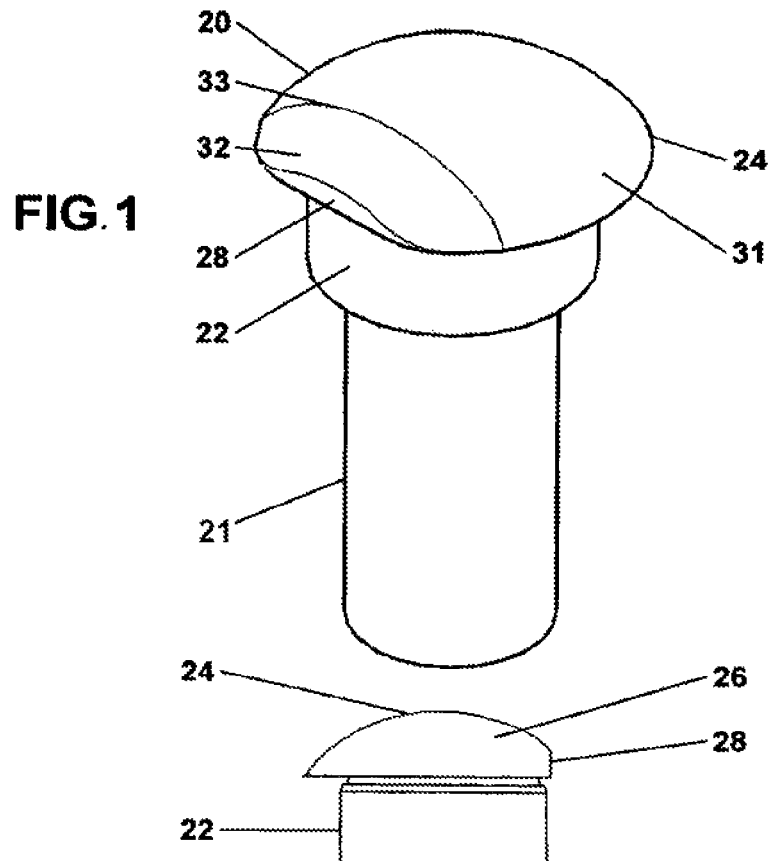
FIG. 1
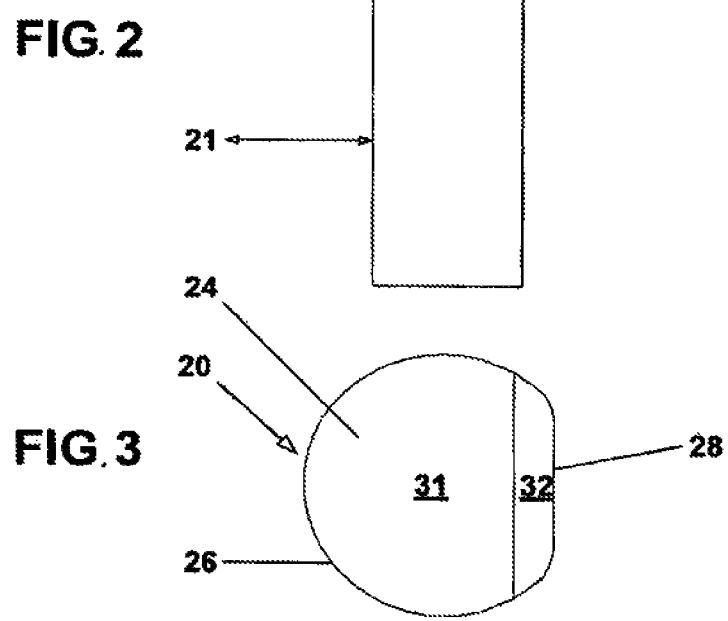
FIG. 2
FIG. 3

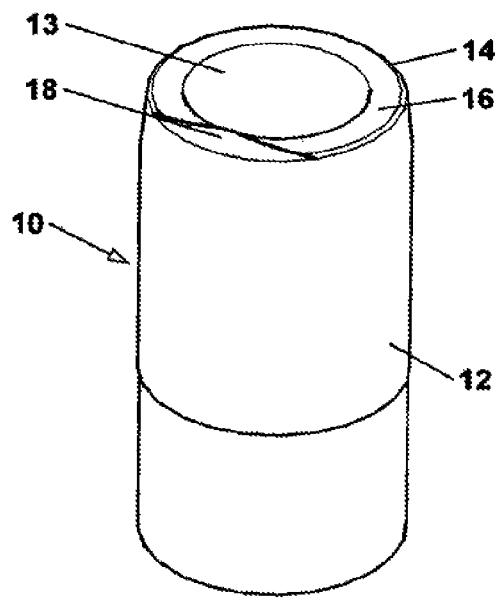
FIG. 4
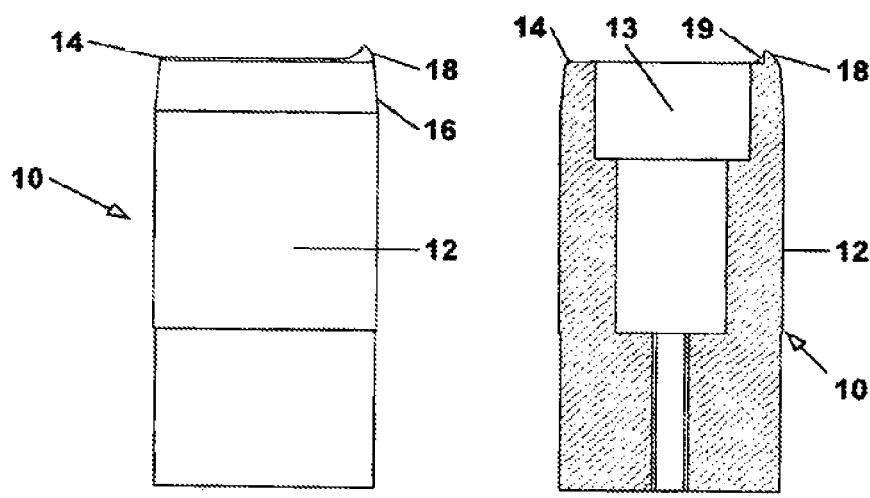
FIG. 5
FIG. 7
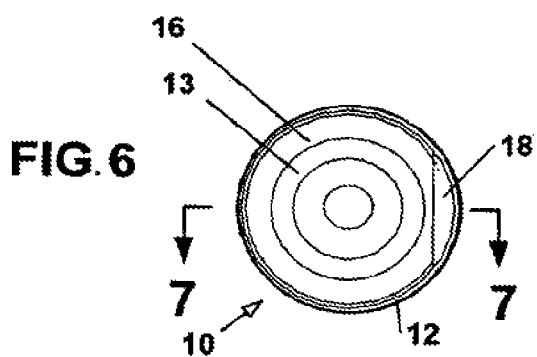
FIG. 6

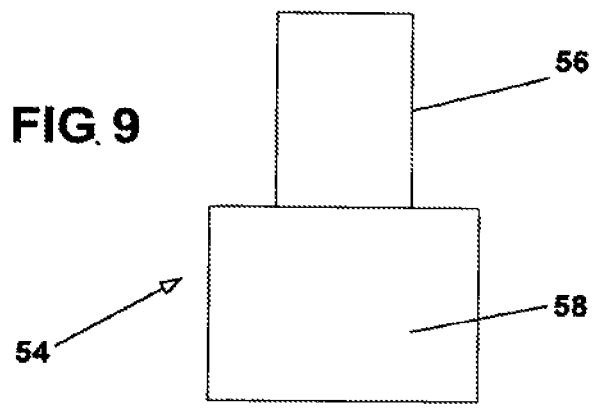
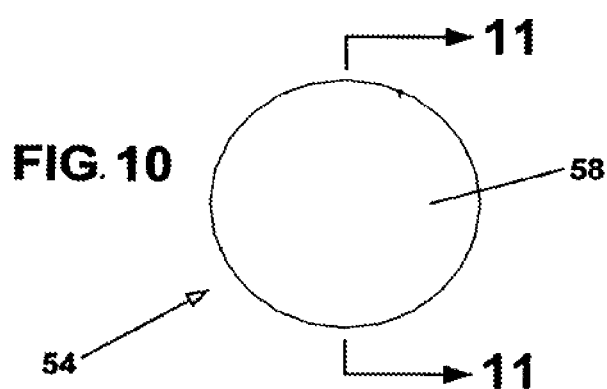
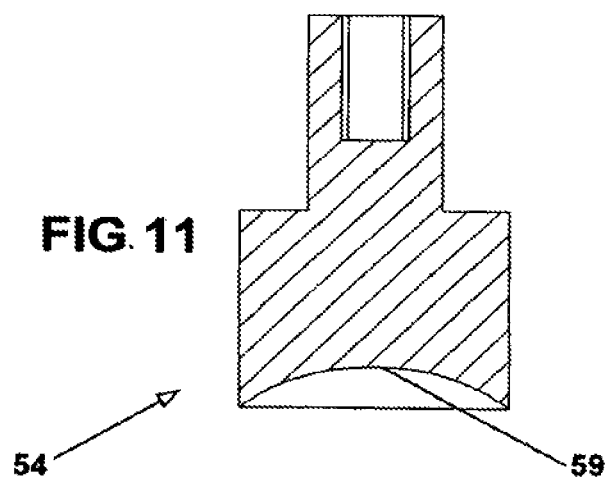

METHOD OF CAST MOULDING A TRANSLATING MULTIFOCAL CONTACT LENS

CROSS-REFERENCE TO PRIORITY APPLICATION

This application is a continuation of U.S. patent application Ser. No. 14/375,104 for A METHOD OF CAST MOULDING A TRANSLATING MULTIFOCAL CONTACT LENS, filed Jul. 28, 2014, which itself claims the benefit of PCT Patent Application Ser. No. PCT/AU2012/000948 for A METHOD OF CAST MOULDING A TRANSLATING MULTIFOCAL CONTACT LENS, filed Aug. 10, 2012, which itself claims the benefit of Australian Patent Application Ser. No. AU2011903685 for A METHOD OF CAST MOULDING A TRANSLATING MULTIFOCAL CONTACT LENS, filed Sep. 9, 2011. Each of the foregoing patent applications and publication is hereby incorporated by reference in its entirety.

TECHNICAL FIELD

The present invention relates to a method of cast molding a translating multifocal contact lens.

BACKGROUND OF THE INVENTION

In Australian Patent Number 769719 there is described and claimed a multifocal contact lens wherein the contact lens is made of flexible material and the contact lens is arranged to translate on an eye.

The entire disclosure of Australian Patent Number 769719 is incorporated herein by reference.

The present invention provides a means of manufacturing a lens of the type described in Australian Patent Number 769719.

SUMMARY OF THE INVENTION

In accordance with one aspect of the present invention there is provided a method or cast molding a multifocal translating contact lens which comprises producing a first mold insert having a surface which is used to produce a first mold having an internal face and a second mold insert having a surface which is used to produce a second mold having an external face, wherein the first mold represents a shape of an anterior face of a contact lens and the second mold represents a shape of a posterior face of a contact lens, wherein the first and second molds are brought together with the external face of the second mold juxtaposed with the internal face of the first mold so as to define a volume therebetween, the volume between the first and second juxtaposed molds being filled with contact lens material, allowing the contact lens volume in the molds to cure to produce the cast molded contact lens, wherein the volume defined by the first and second molds is configured so as to form a contact lens with a lower truncation.

Preferably, the volume defined by the first and second juxtaposed molds also has an internal configuration which produces a forwardly projecting ledge at a lower end of the cast molded contact lens.

More preferably, the internal face of the first mold produces an anterior face of the cast molded contact lens with distance and close range vision segments. The resultant cast molded contact lens preferably has an anterior face with an upper distance vision segment and a lower close range vision segment.

BRIEF DESCRIPTION OF THE DRAWINGS

The present invention will now be described with reference to the accompanying drawings, in which:

FIG. 1 is a perspective view of a first molding member, for use in the method of the present invention;

FIG. 2 is a side elevation of the molding member of FIG. 1;

FIG. 3 is a plan view of the molding member of FIG. 1;

FIG. 4 is a perspective view of a second molding member for use in the method of the present invention;

FIG. 5 is a side elevation of the molding member of FIG. 4;

FIG. 6 is a plan view of the molding member of FIG. 4;

FIG. 7 is a vertical sectional view of the molding member of FIG. 4 along the line 7-7 of FIG. 6;

FIG. 9 is a side elevation of a mold insert for forming a posterior face of a contact lens;

FIG. 10 is an underneath view of the mold insert of FIG. 9;

FIG. 11 is a vertical section along the line 11-11 of FIG. 10

DESCRIPTION OF THE INVENTION

Figure 8:
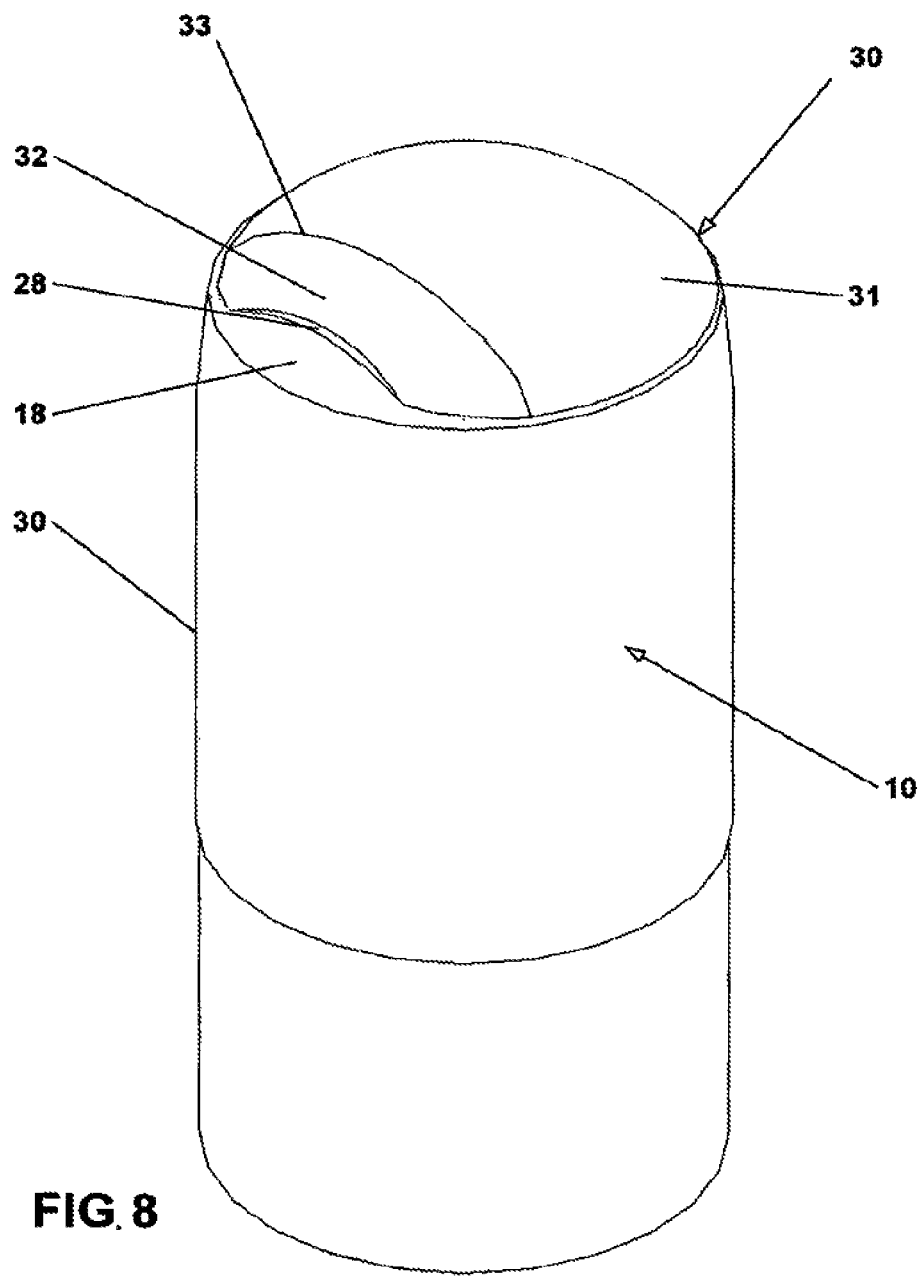
FIG. 8 is a perspective elevation of a mold insert formed from the molding members of FIGS. 1 and 4 for forming an anterior face of a contact lens.

In FIGS. 4 to 7 of the accompanying drawings there is shown a first molding member 10 comprising a cylindrical body 12 having an internal recess 13 with an open upper end 14 as shown. The upper end 14 comprises a rim 16 which is provided with an upstanding projection 18. As can be seen in FIG. 7 the projection 18 has a flat central inner face portion 19.

In FIGS. 1 to 3 of the accompanying drawings there is shown a second molding member 20 having a rod 21 arranged to engage with the recess 13. The rod 21 is provided with an upper enlarged cylindrical portion 22 which is arranged to fit snugly in an upper end of the recess 13 (see FIG. 7) so that the molding member' 20 is, in use, engaged with the molding member 10 in a stable manner so as to be a seamless part of a single insert.

The member 20 is also provided with a cap 24 which is generally circular in plain view as shown in FIG. 3. The cap 24 has an outer domed end surface 26 as best seen in FIG. 2 incorporating surface curves for distance vision 31 and close range vision 32 lens prescriptions separated by a demarcation line 33. Further the cap 24 has a cut away portion 28 on one side as shown. The positioning of the distance vision 31 and close range vision 32 areas of the surface 26 may be varied depending on the areas of 31 and 32 required.

The molding members 10 and 20 are arranged to be joined together as shown in FIG. 8 by inserting the rod 21 into the recess 13 until the portion 22 engages with the upper end of the recess 13 and until the cap 24 engages with the rim 16. In this position the cut away portion 28 is contiguous with and in alignment with the inner face 19 of the upstanding projection 18.

In FIG. 8, there is shown a resultant two part mold insert 30. The upper end 14 of the cylindrical body 12 of the molding member 10 with the rim 16 having the upstanding projection 18 is a first component of the mold insert 30. The cap 24 of the molding member 20 is the second component of the mold insert 30.

The mold insert 30 is arranged to produce a mold for an anterior face of a contact lens of the type described in Australia Patent Number 769719 referred to hereinabove. This may be done by any convenient means such as by injection molding.

In particular, the upstanding projection 18 on the rim 16 is designed to produce a lower truncation in the molded lens. Further, the cut away portion 28 is arranged to produce a lower forwardly projecting ledge in the molded lens. As shown in FIG. 8, in the mold insert 30, the cut away portion 28 engages with the projection 18 as indicated hereinbefore. The domed surface 26 has a first curve representing an upper distance vision segment 31 and a second curve representing a lower reading power segment 32.

As described in Australian Patent Number 769719 the truncation and the forwardly projecting ledge are arranged to engage with a lower eyelid of a user to facilitate translation. To form a posterior face in a molded contact lens it is simply necessary to produce a mold insert with a standard curvature. This incorporates the lens base curve that is necessary to fit an eye and may be spherical, toroidal or aspheric in shape or it may be a combination of curves. The posterior surface may also comprise a peripheral design (not shown) in known manner to facilitate translation when the ledge engages with a lower eyelid in looking down. A typical mold insert 54 for the posterior face is shown in FIGS. 9 to 11. The mold insert 54 comprises a rod 56 for mounting in an injection molding machine. Further, there is provided a generally circular molding member 58. The member 58 has an interior with a curved surface 59 which conforms to the desired curvature of the posterior face of the resultant contact lens.

The mold inserts 30 and 54 may be produced by any convenient method but the use of a precision computer-controllable manufacturing lathe to produce the molding tools is preferred. This device is used to lathe the components of the mold inserts 30 and 54 to the precise specifications needed to produce a mold surface which is then replicated on the anterior and posterior surface of the lens with the required curvature. Further, the mold insert 30 is configured to produce simultaneously the truncation and the forwardly projecting ledge.

The mold insert 30 is preferably made in two parts as described but it can be made in one part if desired. However, producing it in two parts has the advantage that the domed surface 26 containing the power curvatures for the anterior surface is formed separately so as to customize the curvature to suit the different power needs without the need to be concerned about formation of the truncation with each molding member 10.

Figure 12:
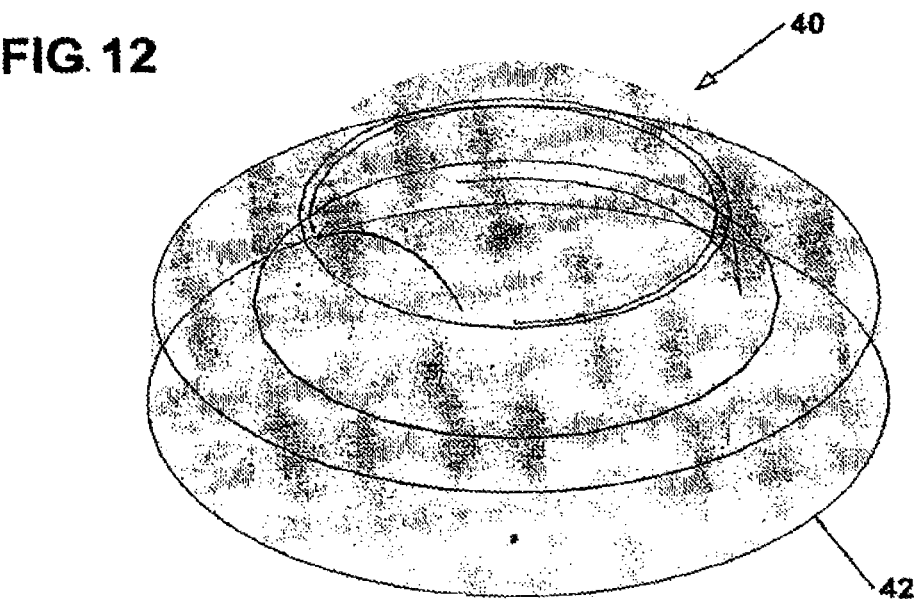
FIG. 12 is a perspective view of a mold formed from the mold insert of FIG. 8.
Figure 13:
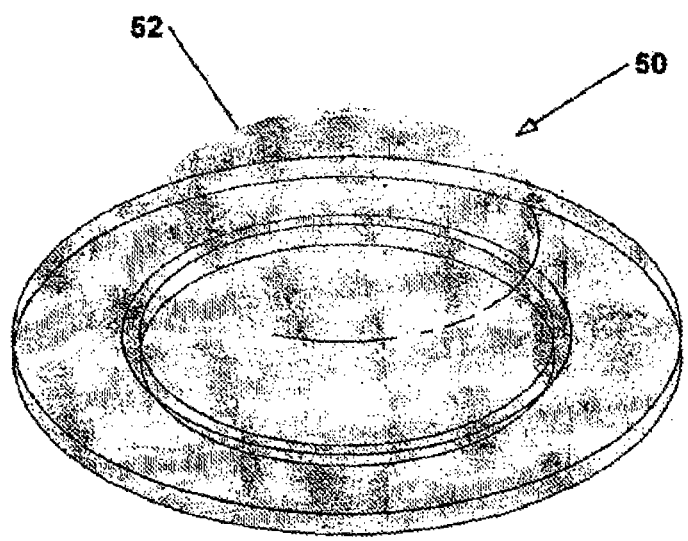
FIG. 13 is a perspective view of a mold formed from the mold insert of FIG. 9.

An anterior face contact lens mold may be manufactured using the mold insert 30 of the present invention by using the mold insert 30 to form a plastics material or glass mold 40 or the like for the front face of a lens as shown in FIG. 12 in known manner such as by injection molding. Similarly, a contact lens mold 50 as shown in FIG. 13 for the posterior face of a lens may be formed from a molding material by means of a rear surface molding tool shown in FIGS. 9 to 11 in known manner such as by injection molding.

Figure 14:
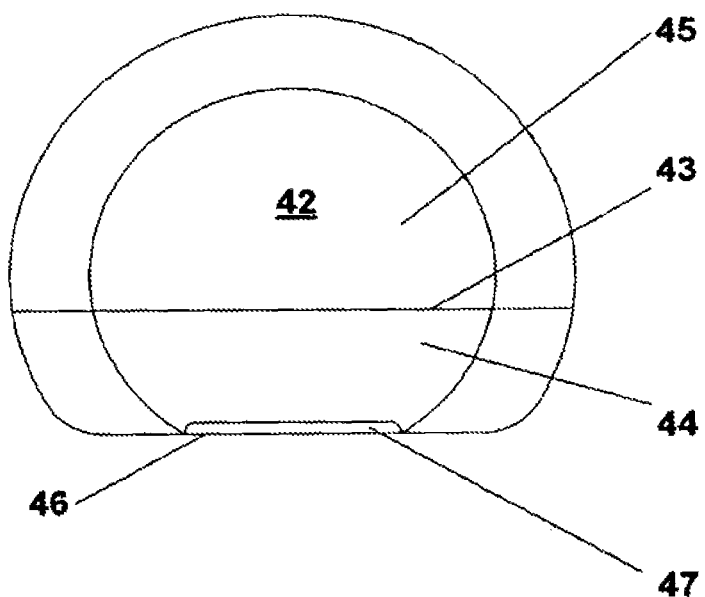
FIG. 14 is a plan view of an interior of the mold of FIG. 12.

In FIG. 14 there is shown the internal face 42 of the mold 40 produced from the mold insert 30 as described hereinabove. It can be seen that the internal face has a demarcation 43 between a lower reading vision segment 44 and upper distance vision segment 45. Further the internal face 42 has a provision 46 for the ledge and also a provision 47 for the truncation.

Figure 15:
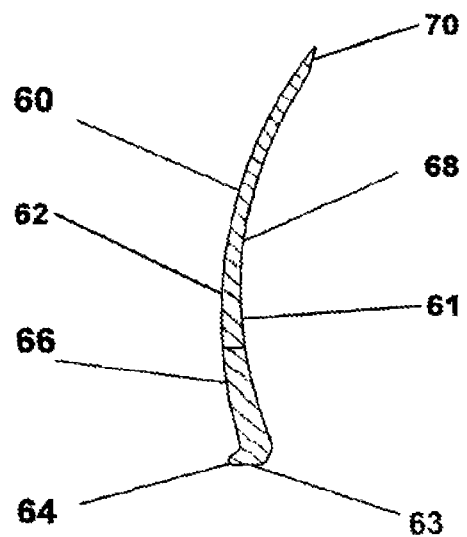
FIG. 15 is a side elevation of a contact lens produced by the method of the present invention.

A typical contact lens 60 cast molded by the method of the present invention is shown in FIG. 15 showing a posterior face 61 and an anterior face 62. There is also shown a lower truncation 63, a forwardly projecting ledge 64 and the close and distance vision segments 66 and 68 respectively. It is found that the ledge 64 adds bulk to the lower end of the lens 60 so allowing good lid action on the contact lens 60 and the truncation 62 provides a relatively wide surface for resting on a lower eyelid. Further, an upper end of the posterior face 61 is provided with a peripheral lenticulation 70 to facilitate translocation of the lens 60 on the eye.

To cast mold a contact lens in accordance with the present invention to the design as described in Australian Patent number 769719 referred to hereinabove, as shown in FIG. 14, lens material may applied such as by injection, onto a surface of one mold 40 or 50 and an opposing surface of the other mold 40 or 50 may then be placed on to the first mentioned surface. The volume defined between the two juxtaposed surfaces provides the design and thickness in all the lens parameters of the lens required. For example material may be placed on an internal surface 42 of the mold 40 and an external surface 52 of the mold 50 may be engaged with the surface 42 of the mold 40.

The material is then subjected to curing in known manner to achieve polymerization. The mold is then opened and the resulting lens removed.

Further, in addition to lower reading vision and upper distance vision portions the anterior face of the lens may be provided with an intermediate vision portion or a progressive close portion. Also, the resulting lens may be provided with peripheral lenticulated portions in known manner to reduce bulk.

Modifications and variations such as would be apparent to a skilled addressee are deemed to be within the scope of the present invention.

The invention claimed is:

1. A method of cast moulding an alternating vision multifocal soft contact lens made of flexible material, the method comprising:
   providing a mould insert having a surface which is used to produce a first mould having an internal surface for forming an anterior surface of a multifocal contact lens, wherein the mould insert comprises:
      an upstanding projection for configuring the multifocal contact lens so as to produce a truncation in the multifocal contact lens;
      a domed surface for configuring the multifocal contact lens so as to produce multifocal lens powers of the multifocal contact lens, wherein the domed surface comprises a cut away portion corresponding to the configuration of the upstanding projection, configured for producing a forwardly projecting ledge in the multifocal contact lens;
   forming the first mould using the mould insert, wherein the first mould has the internal surface for forming the anterior surface of the multifocal contact lens, wherein the internal surface of the first mould comprises:

a domed surface corresponding to the domed surface of the mould insert that configures the multifocal contact lens to produce the multifocal lens powers of the multifocal contact lens; and a raised portion and a depression corresponding to the cut away portion and the upstanding projection of the mould insert that configure the multifocal contact lens to produce the truncation and the forwardly projecting ledge of the multifocal contact lens;

providing a second mould, wherein the second mould has an external surface for forming a posterior surface of the multifocal contact lens incorporating the truncation; and forming the multifocal contact lens, comprising:

positioning the first and second moulds adjacent one another such that the internal surface of the first mould is juxtaposed with the external surface of the second mould so as to define a volume therebetween;

filling the volume between the first and second juxtaposed moulds with contact lens material, wherein the domed surface of the first mould configures the multifocal contact lens to produce the multifocal lens powers and the raised portion and the depression of the first mould configure the multifocal contact lens to produce the truncation and the forwardly projecting ledge; and allowing the multifocal contact lens material in the volume to cure to produce the multifocal contact lens having the truncation and the forwardly projecting ledge at a lower end thereof.

2. A method according to claim 1, wherein the produced multifocal contact lens has the anterior face with an upper distance vision segment and a lower close range vision segment.

3. A method according claim 1, wherein the multifocal contact lens material is applied onto the internal face of the first mould and/or onto the external face of the second mould and the first and second moulds are subsequently juxtaposed to define the volume for production of the multifocal contact lens filled with contact lens material.

4. The method according to claim 1, wherein the domed surface comprises a first surface curve configured for producing a first vision range of the multifocal contact lens, and a second surface curve configured for producing a second vision range of the multifocal contact lens.

5. A multifocal contact lens made according to the method recited in claim 1.

* * * * *